United States Patent [19]

Buhler

[11] 3,797,515

[45] Mar. 19, 1974

[54] VACUUM BREAKER

[75] Inventor: Andreas Buhler, Krugersdorp, South Africa

[73] Assignee: Castle Brass Works (Proprietary) Limited, Factoria, Luipaardsvlei Transvaal Province, South Africa

[22] Filed: Aug. 30, 1972

[21] Appl. No.: 284,967

[30] Foreign Application Priority Data
Aug. 30, 1971 South Africa.................... 71/5788

[52] U.S. Cl.............................. 137/218, 137/525.1
[51] Int. Cl............................................ F16k 45/00
[58] Field of Search ........... 137/215, 216, 217, 218, 137/525.1

[56] References Cited
UNITED STATES PATENTS

| 3,125,114 | 3/1964 | Langdon............................ 137/218 |
| 2,663,309 | 12/1953 | Filliung............................. 137/218 |
| 2,092,757 | 9/1937 | Groeniger.................... 137/525.1 X |
| 2,897,835 | 8/1959 | Philippe............................. 137/218 |
| 2,948,297 | 8/1960 | Langdon.......................... 137/218 X |
| 3,334,646 | 8/1967 | Billeter et al....................... 137/218 |
| 3,417,775 | 12/1968 | Smith................................. 137/218 |
| 3,543,786 | 12/1970 | Woodford.......................... 137/218 |

Primary Examiner—Alan Cohan
Assistant Examiner—Gerald A. Michalsky
Attorney, Agent, or Firm—Holman & Stern

[57] ABSTRACT

A vacuum breaker which has an inner member through which liquid flows, the inner member having a restricted outlet, a resiliently flexible sleeve closely fitting around the inner member, and a casing surrounding, with clearance, the sleeve. A ring of openings is formed in said member, and the sleeve and member sealingly engage with one another both upstream and downstream of the openings. When the interior of the member is under pressure, the sleeve is "bulged" outwardly into sealing contact with the casing by fluid passing through the openings. This cuts-off the communication which otherwise exists, via said clearance, between air vents provided in the casing upstream of the openings and the interior of the breaker downstream of the outlet from the tubular member and sleeve. The outlet from the sleeve is normally closed by a plurality of flaps of the sleeve which are resiliently biased to their closed condition.

2 Claims, 6 Drawing Figures

PATENTED MAR 19 1974 3,797,515

VACUUM BREAKER

BACKGROUND OF THE INVENTION

This invention relates to vacuum breakers.

Vacuum breakers are used, for example, in water systems in which there exists the danger that back syphoning may occur from a contaminated plumbing fixture such as a water closet which would result in contamination of the water supply.

OBJECT AND SUMMARY OF THE INVENTION

The object of the present invention is to provide a vacuum breaker which is not only less expensive to make than known ones but also operates more efficiently.

According to one aspect of the present invention there is provided a vacuum breaker which comprises:

i. a tubular member defining a fluid flow passage, said member having a ring of openings in its wall and also having a restricted outlet;
ii. a resilient sleeve around said member, said sleeve comprising a plurality of flaps beyond said outlet of said member which flaps are biased closably towards each other to define an outlet from the sleeve downstream of the restricted outlet of the tubular member;
iii. an outer casing fitting around said sleeve with a clearance space therebetween and against which casing pressure in said tubular member upstream of said outlet and acting through said openings peripherally expands the flexible sleeve so that it seats sealingly around the inside of the tubular casing; an
iv. air vents formed in the wall of said casing upstream of said openings and which communicate via said clearance space with the interior of the valve downstream of the outlet from said sleeve in the absence of pressure in said member causing said sleeve to be peripherally expanded to seat on said casing and thereby close said clearance space between said vents and said interior of the valve downstream of said outlet.

It is preferable for the air vents to be concealed by a skirt thereby to prevent them being rendered inoperative by being blocked. Preferably, the skirt forms part of a ring nut.

In the prefered constructional form said member and said sleeve are sealingly engaged with one another both upstream and downstream of said openings thereby to define a cavity between said member and sleeve into which cavity said openings lead.

In this constructional form, said sleeve can be formed downstream of said openings with an internal, circumferentially extending rib and said member can be formed with an external circumferentially extending groove which receives said rib, and additionally said sleeve, upstream of the openings, can be gripped between said member and said casing so as sealingly to engage both the casing and the member.

According a further aspect of the present invention there is provided a sleeve for a vacuum breaker, which sleeve is made of resiliently flexible material and which has:

i. a tubular portion;
ii. an open inlet at one end of said portion;
iii. an outlet at the other end of said portion; and
iv. a plurality of flaps integral with said portion and projecting from said portion to beyond said outlet, said flaps being resiliently biased towards one another in the closing direction and being displaceable in the opening direction by pressure in the sleeve.

The sleeve may comprise an internal circumferential rib between said ends. Furthermore, the sleeve may include a sealing flange at the inlet end thereof.

For a better understanding of the present invention, and to show how the same may be carried into effect, reference will now be made, by way of example, to the accompanying drawings in which:

Figure 1:
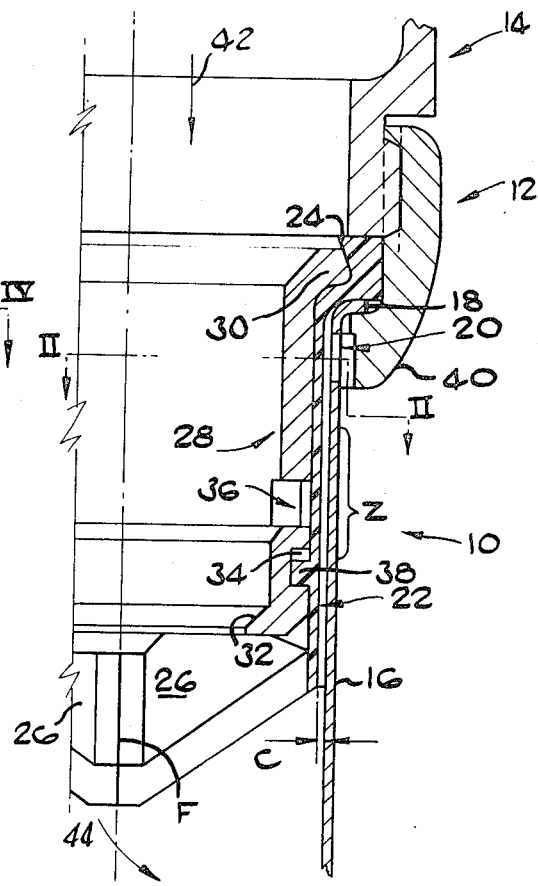
FIG. 1 is a part longitudinal section of a first form of vacuum breaker, the section being taken along line I—I in FIG. 2.
Figure 2:
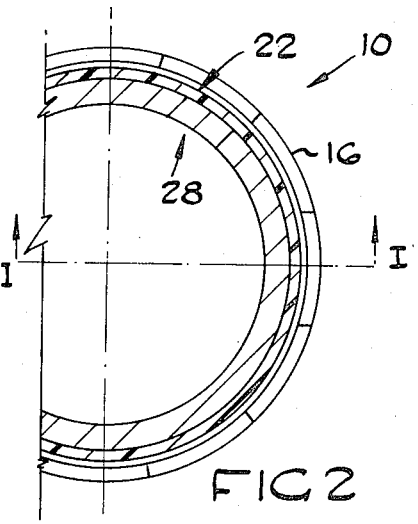
FIG. 2 is a part cross-section of the breaker of FIG. 1, the section being taken along line II—II in FIG. 1.

Referring firstly to FIGS. 1 and 2, reference numeral 10 indicates generally a vacuum breaker which is secured by a ring nut 12 to the outlet of a flush valve 14.

The vacuum breaker comprises a tubular casing 16 having a flange 18 at its inlet end and a circumferentially arranged array of air vents 20 near said inlet end. The vacuum breaker further comprises a resiliently flexible sleeve generally indicated by reference numeral 22 which has a peripheral flange 24 at its inlet end. The flange 24 seats on the flange 18 of the tubular casing 16. The flexible sleeve includes a plurality of flaps 26 which are biased towards each other to define a restricted outlet from the hollow interior of the flexible sleeve 22 when the valve is closed. The sealing faces of the flaps abut one another along sealing lines one of which (referenced F) is shown in FIG. 1. The flexible sleeve 22, which fits with clearance (marked C in FIG. 1) inside the casing 16, is made of a material such as rubber, Neoprene or the like and may be in the form of a molding.

Inside the flexible sleeve 22 there is provided a tubular member 28 which defines a fluid flow passage and which has a peripheral flange 30 at its inlet end. The sleeve closely fits the member 28. The flange 30 seats in an internal recess of the flange 24 of the flexible sleeve 22. The tubular member 28 is formed with an inwardly directed rib 32 at its outlet end, with this rib defining a restricted outlet from the interior of the member 28. The restricted outlet serves to raise the pressure inside the tubular member to a value higher than that downstream of the outlet. The tubular member 28 is also provided with a circumferential groove 34 around its outer periphery, and with a circumferential array of ports 36 above the groove 34. The groove 34 serves to receive a circumferential rib 38 formed on the inner periphery of the sleeve 22.

The ring nut 12 has a skirt 40 which is spaced radially away from the air vents 20 in the tubular casing 16, with the skirt depending to below the air vents to conceal them from view and thus minimize the risk of them being blocked.

In operation, water flows in the direction of arrow 42 under upstream pressure. Such upstream pressure causes water to pass through the ports 36 and bulges the sleeve 22 outwardly thereby taking up the clearance space C between its outer surface and the inner surface of the tubular casing 16. This bulging takes place in the zone Z which is well downstream of the air vents 20. This ensures that the pressure inside the cavity defined between the flexible sleeve 22 and the tubular member 28 does not cause the flexible sleeve to be extruded through the air vents 20. Thus, during normal operation, the vents 20 are sealed-off from the interior of the breaker.

Water after having passed through the restricted outlet from the member 28 exerts pressure on the flaps 26 thereby causing them to deflect outwardly in the direction of arrow 44. Such deflection of the flaps 26 causes the valve to open and water then flows through the breaker.

If a vacuum condition should come into existence on the upstream side of the vacuum breaker, then the flaps 26 collapse inwardly into abutting contact along the lines F and prevent reverse flow of water through them. At the same time, the resiliently flexible sleeve 22 collapses inwardly thereby opening the thereby C and placing the interior of the breaker in communication with the air vents 20. The inside of the tubular casing downstream of the flaps 26 is, in this condition, thus at atmospheric pressure and no back syphoning can occur.

Interengagement between the rib 38 and the groove 34 prevents the sleeve 22 being stretched downwardly when the breaker is internally pressurized.

Figure 5:
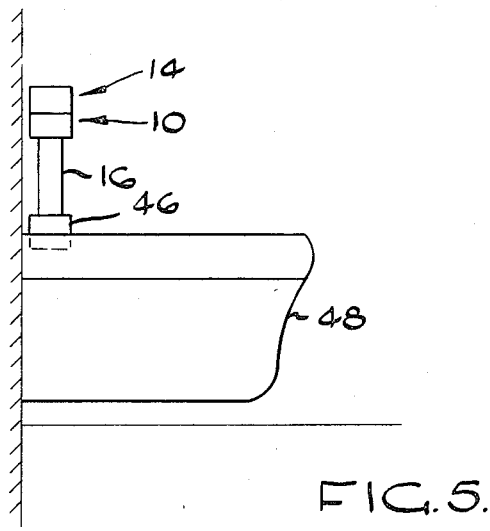
FIG. 5 is a diagrammatic side view of a toilet installation in which the vacuum breaker of FIGS. 1 and 2 is used.

When the embodiment of the invention illustrated in FIGS. 1 and 2 of the drawings is installed, it is conveniently included in a system having a top inlet, such as is shown in FIG. 5. In such a system, the lower end of the casing 16 is cut to the correct length and it is fitted into a top inlet socket 46 of a toilet bowl 48.

Figure 3:
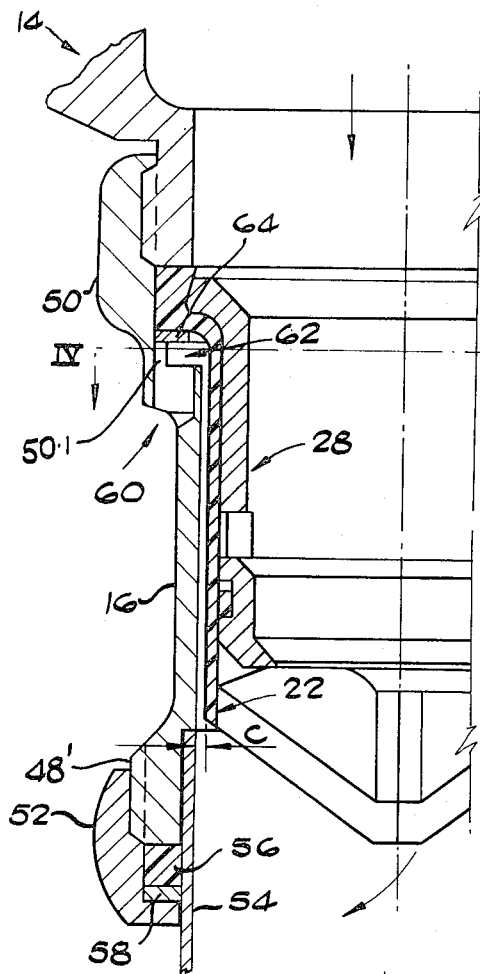
FIG. 3 is a part longitudinal section of a second form of breaker, the section being taken along line III—III in FIG. 4.
Figure 4:
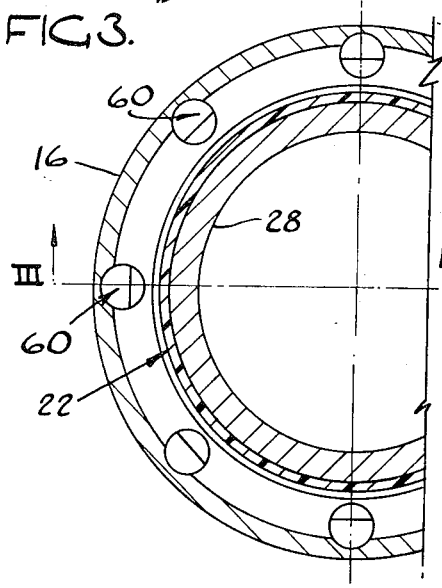
FIG. 4 is a part cross-section taken along the line IV—IV in FIG. 3.

Referring now to FIGS. 3 and 4 of the drawings, there is shown an alternative construction of vacuum breaker which is adapted to fit over the upper end of a down pipe and in which it is the upper end of the down pipe which is cut to get the correct length. In this embodiment, the casing 16 is in the form of a tubular spacer member and has integral therewith a female threaded portion 50 for screwing onto the outlet end of the flush valve 14. The lower end of the casing 16 is provided with a male thread 48' for engagement with a ring nut 52 which is adapted to fit around a down pipe 54. The ring nut is adapted to squeeze a ring gasket 56 sealingly against the outer surface of the pipe 54. For this purpose a washer 58 is provided to seat against the gasket 56. The upper end of the down pipe 54 fits into the lower end of the spacer 16 which is recessed for this purpose. A plurality of circumferentially spaced holes 60 and a counter bore 62 ensure that the clearance space C is in communication with the atmosphere. In this embodiment, the flange 24 seats on a ring 64 which can be considered to be part of the casing 16. Ring 64 prevents the flange 50.1 from biting into the rubber of the flange of the sleeve 22.

Figure 6:
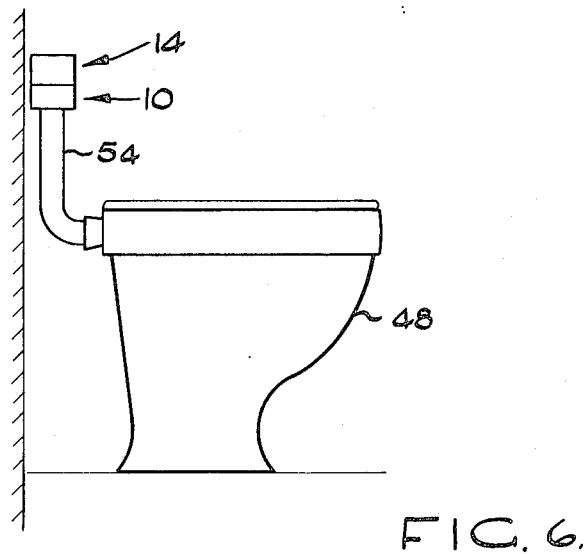
FIG. 6 is a diagrammatic side view of a toilet installation in which the vacuum breaker of FIGS. 3 and 4 is used.

The flexible sleeve 22 and tubular member 28 in FIGS. 3 and 4 are identical to the corresponding parts in FIGS. 1 and 2. Furthermore, the method of operation is the same, with the embodiment of FIGS. 3 and 4 being intended to be used in a rear-inlet type of toilet fitting as shown in FIG. 6 of the drawings. In such an arrangement it is the upper end of the down pipe 52 which is cut to a suitable length to fit into the lower end of the casing 16 to an adequate extent.

I claim:

1. A vacuum breaker which comprises:
   i. a tubular member defining a fluid flow passage, said member having a ring of openings in its wall and also having a restricted outlet;
   ii. a resilient sleeve around said member, said sleeve comprising a plurality of flaps beyond said outlet of said member which flaps are biased closably towards each other to define an outlet from the sleeve downstream of the restricted outlet of the tubular member; said member and said sleeve being sealingly engaged with one another both upstream and downstream of said openings thereby to define a cavity between said member and sleeve into which cavity said openings lead, and said sleeve being formed downstream of said openings with an internal, circumferentially extending rib and said member being formed with an external circumferentially extending groove which receives said rib;
   iii. an outer casing fitting around said sleeve with a clearance space therebetween and against which casing pressure in said tubular member upstream of said outlet and acting through said openings peripherally expands the flexible sleeve so that it seats sealingly around the inside of the tubular casing; and
   iv. air vents formed in the wall of said casing upstream of said openings and which communicate via said clearance space with the area downstream of the outlet from said sleeve in the absence of pressure in said member causing said sleeve to be peripherally expanded to seat on said casing and thereby close said clearance space between said vents and said area downstream of said outlet.

2. A vacuum breaker which comprises:
   i. a tubular member defining a fluid flow passage, said member having a ring of openings in its wall and also having a restricted outlet;
   ii. a resilient sleeve around said member, said sleeve comprising a plurality of flaps beyond said outlet of said member which flaps are biased closably towards each other to define an outlet from the sleeve downstream of the restricted outlet of the tubular member, and further comprising means interengaging with said member downstream of said ring of openings to prevent stretching of the sleeve in the downstream direction when it is under internal pressure;
   iii. an outer casing fitting around said sleeve with a clearance space therebetween and against which casing pressure in said tubular member upstream of said outlet and acting through said openings peripherally expands the flexible sleeve so that it seats sealingly around the inside of the tubular casing; and iv. air vents formed in the wall of said casing upstream of said openings and which communicate via said clearance space with the area downstream of the outlet from said sleeve in the absence of pressure in said member causing said sleeve to be peripherally expanded to seat on said casing and thereby close said clearance space between said vents and said area downstream of said outlet.

* * * * *